(No Model.) 6 Sheets—Sheet 1.

C. TELLIER.
APPARATUS FOR UTILIZING ATMOSPHERIC OR SOLAR HEAT FOR RAISING WATER.

No. 433,055. Patented July 29, 1890.

(No Model.) 6 Sheets—Sheet 2.
C. TELLIER.
APPARATUS FOR UTILIZING ATMOSPHERIC OR SOLAR HEAT FOR RAISING WATER.
No. 433,055. Patented July 29, 1890.
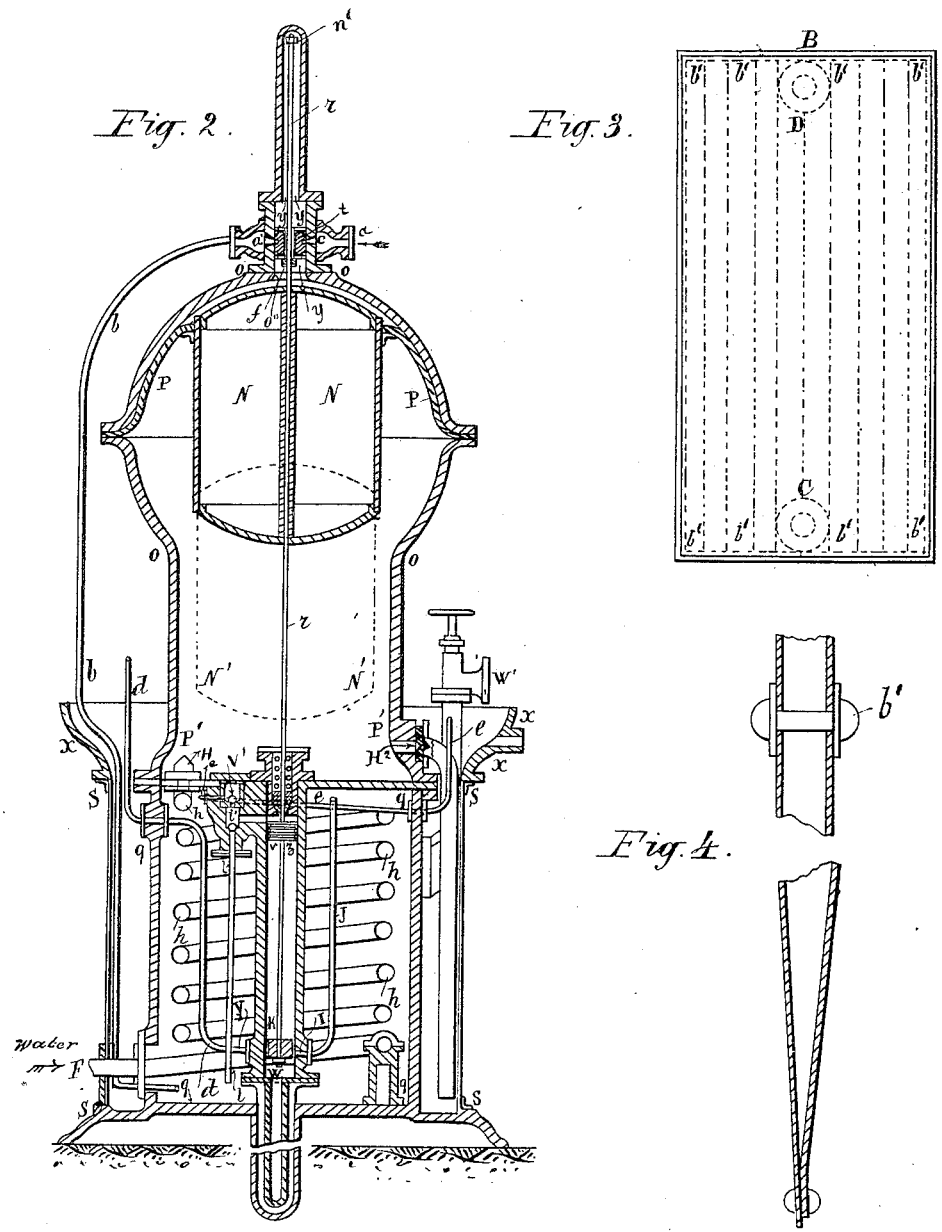

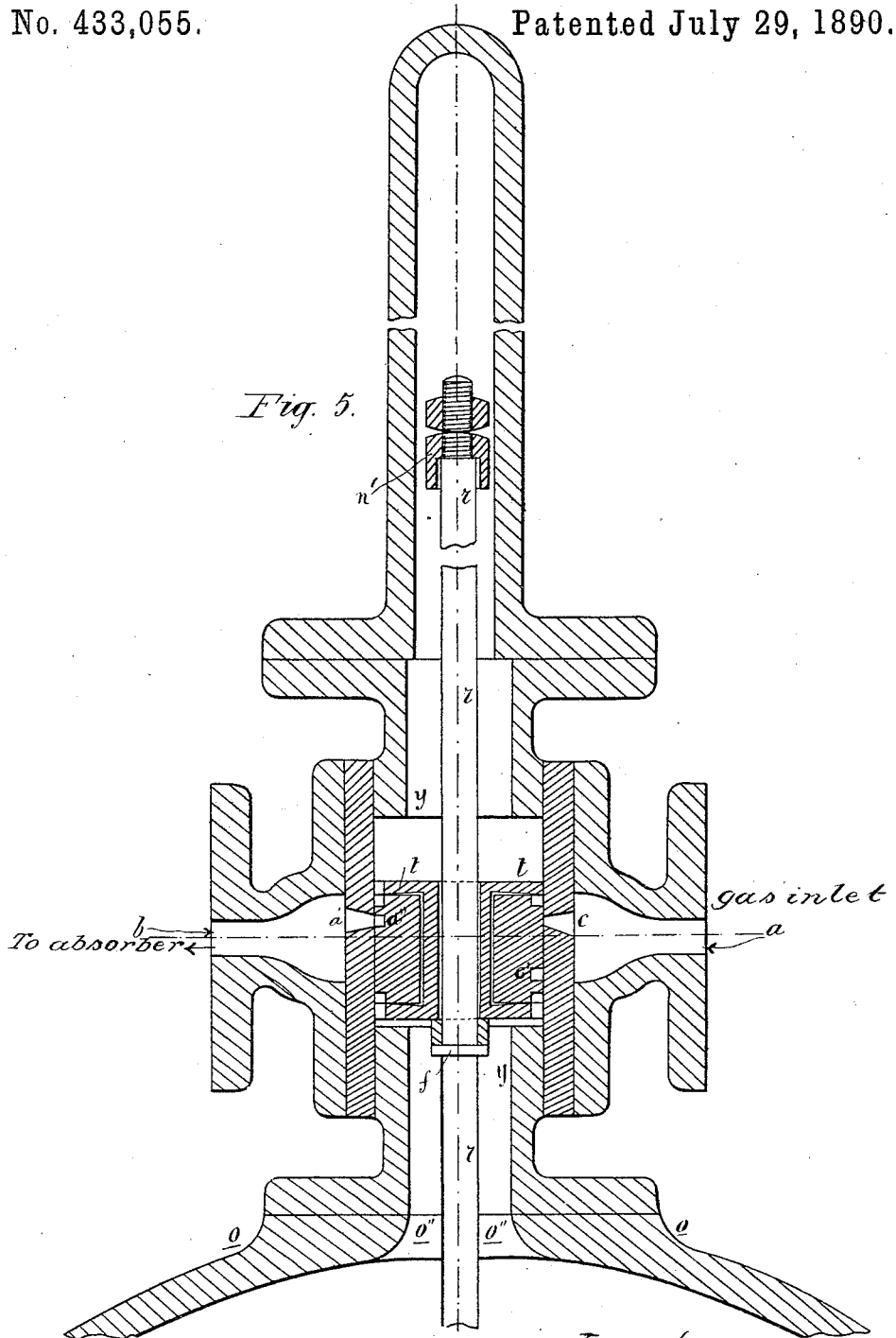

(No Model.) 6 Sheets—Sheet 4.
C. TELLIER.
APPARATUS FOR UTILIZING ATMOSPHERIC OR SOLAR HEAT FOR RAISING WATER.

No. 433,055. Patented July 29, 1890.

(No Model.) 6 Sheets—Sheet 5.
C. TELLIER.
APPARATUS FOR UTILIZING ATMOSPHERIC OR SOLAR HEAT FOR RAISING WATER.

No. 433,055. Patented July 29, 1890.

Witnesses
Arthur H. Abell.
H. H. Nicholson

Inventor
Charles Tellier.
John J. Halsted for
his Atty's (No Model.) 6 Sheets—Sheet 6.
C. TELLIER.
APPARATUS FOR UTILIZING ATMOSPHERIC OR SOLAR HEAT FOR RAISING WATER.

No. 433,055. Patented July 29, 1890.

UNITED STATES PATENT OFFICE.

CHARLES TELLIER, OF PARIS, FRANCE.

APPARATUS FOR UTILIZING ATMOSPHERIC OR SOLAR HEAT FOR RAISING WATER.

SPECIFICATION forming part of Letters Patent No. 433,055, dated July 29, 1890.

Application filed February 2, 1887. Serial No. 226,245. (No model.)

*To all whom it may concern:*

Be it known that I, CHARLES TELLIER, a citizen of the Republic of France, residing at Paris, France, have invented a new and useful Apparatus for Utilizing Solar or Atmospheric Heat for Raising Water and other Purposes, of which the following is a specification.

My invention relates to an apparatus for utilizing solar or atmospheric heat for raising water or for other purposes.

Figure 1:
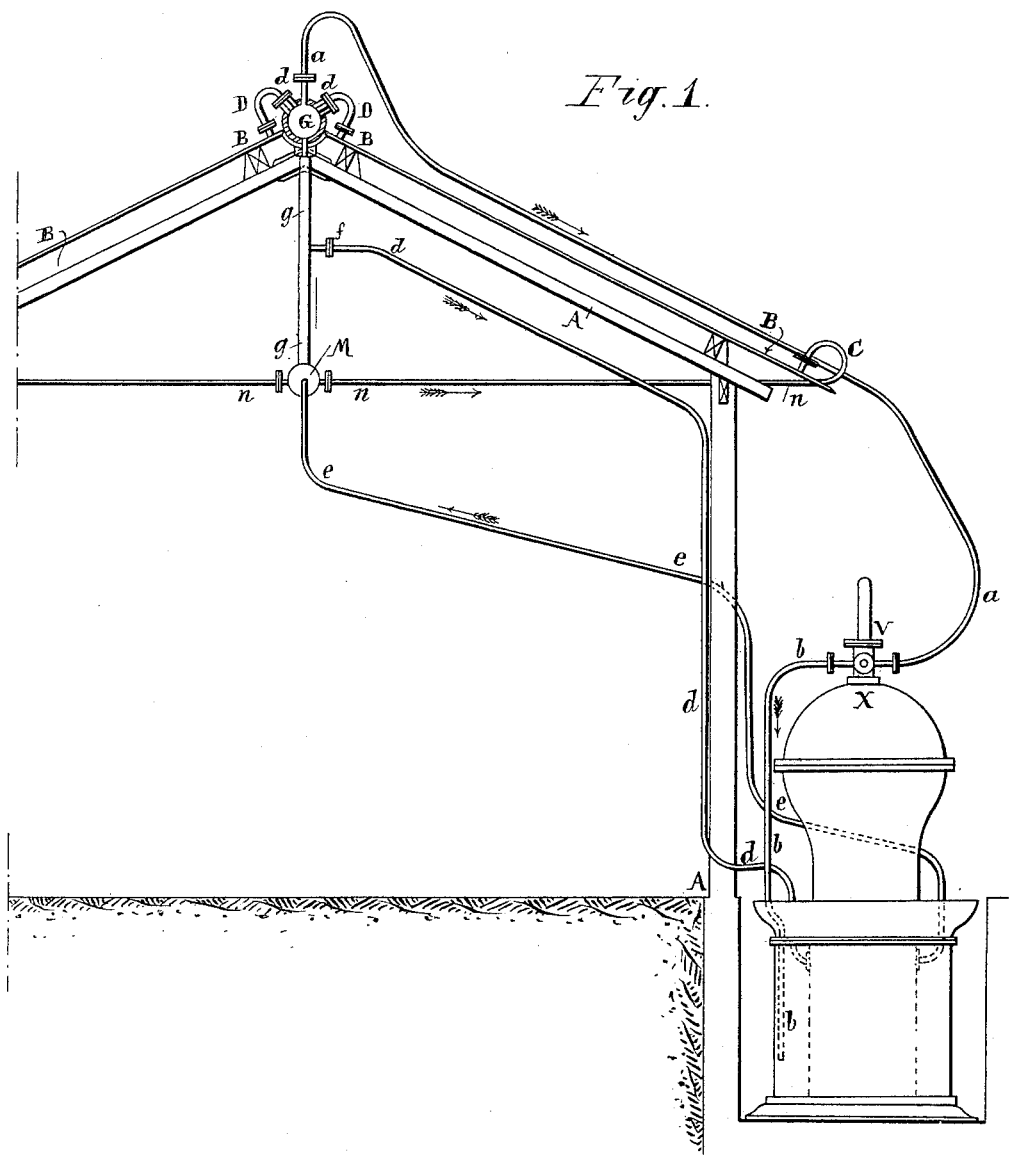
Figure 6:
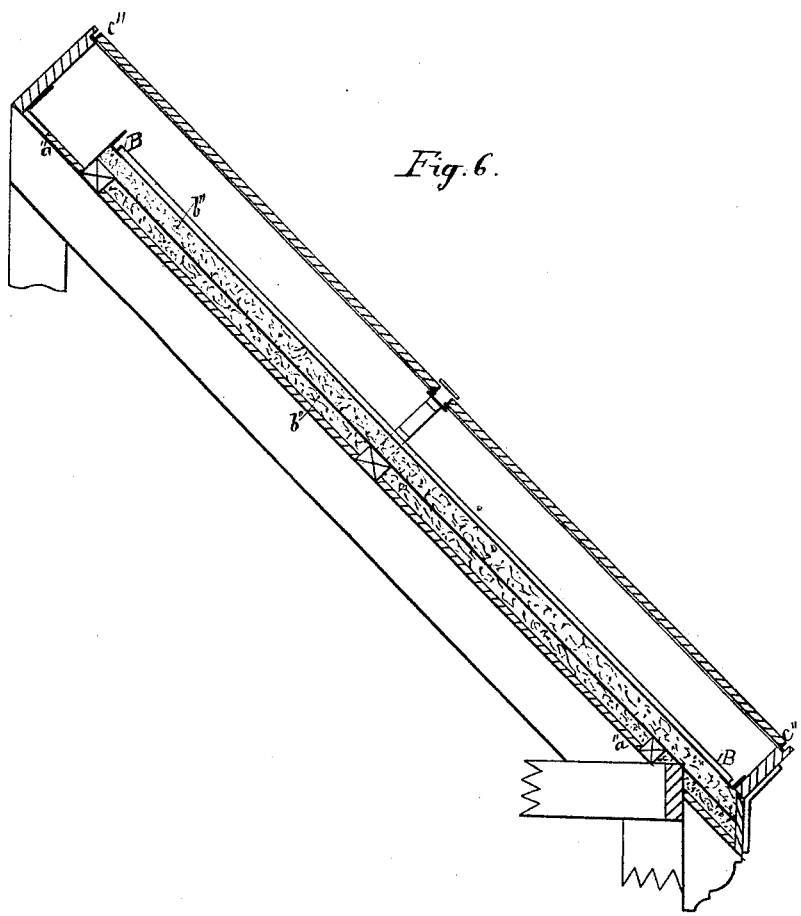
Figure 7:
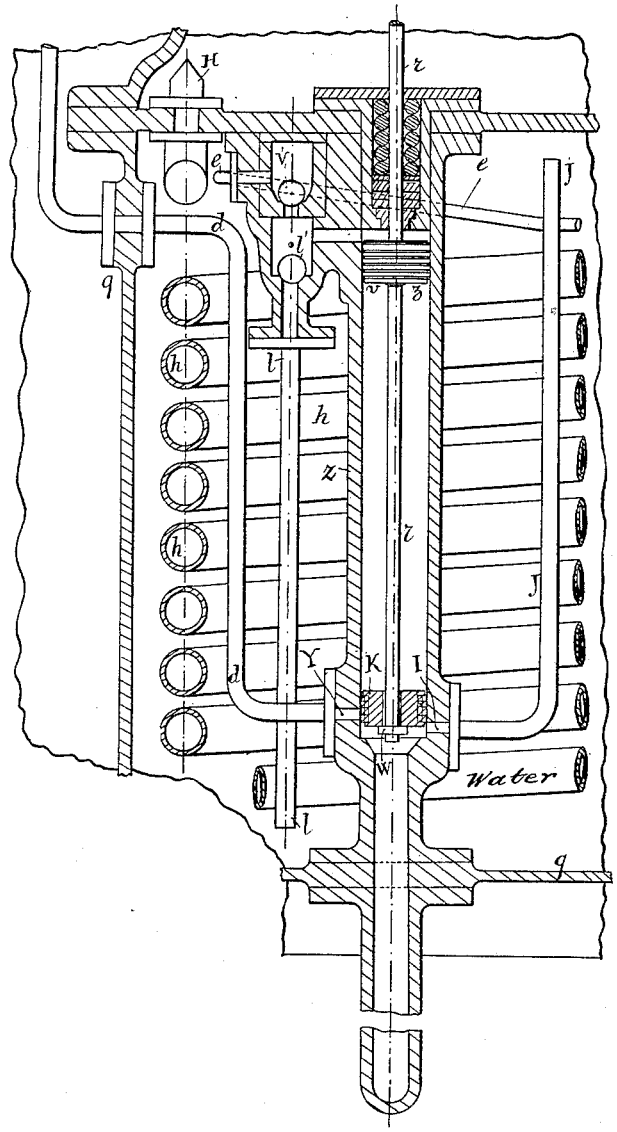

In the accompanying drawings, Figure 1 is a vertical section of part of a shed provided with calorific chambers, and showing at the side of the said shed an elevation of the apparatus for raising water. Fig. 2 is a vertical section of the water raising apparatus. Fig. 3 is a plan or face view of one of the calorific chambers. Fig. 4 is a section of the end of the said chamber. Fig. 5 is a section, drawn to an enlarged scale, of a distributing apparatus, forming the top part of the apparatus shown in Fig. 2. Fig. 6 is a vertical section of part of the roof of a shed provided with a calorific chamber having an insulating-bed and surmounted by a glazed frame. Fig. 7 is a vertical section, drawn to an enlarged scale, of a pump contained in the vessel or tank forming part of the apparatus shown in Fig. 2; and Fig. 8, a side view of the slide, the outer wall which covers the slide being removed.

Similar letters in all the figures indicate similar parts.

The apparatus may be divided into main portions, the first of which receives the sun's rays or the atmospheric heat, and the second utilizes the motive power produced by the heat.

Fig. 1 represents in section part of a building having a roof with two sloping portions; but it is preferable to employ only one sloping portion. The roof is formed of hollow plates or calorific chambers, as shown in Fig. 3, and which, when filled with an ammonical solution, serve to receive the action of the solar rays.

As shown in Figs. 3 and 4, each chamber or hollow plate comprises two sheet-iron plates connected by rivets placed along their edges, stays or cross-pieces placed along the line of rivets $b\ b\ b\ b$ serving to keep the sheet-iron plates apart. The distance apart is about one centimeter, as shown by Fig. 4, which is drawn full size. The stays or cross-pieces can be dispensed with, and in this case the plates are fixed together by means of rivets, and water compressed by means of a hydraulic press is then introduced between the two plates, so as to produce in the plates swellings and depressions—such as those produced in a chair or couch by the buttons which secure the stuffing in the seats thereof—the depressions forming the necessary spaces for the admission of the liquid to be vaporized. Each chamber is provided with two tubes C and D, Fig. 1, and the liquid introduced through the tubes C traverses the interior of the chambers B B, and is submitted in its progress to the action of the solar rays or of that of the atmospheric heat.

In order to completely utilize the heat, which is very considerable in hot climates, the calorific chambers, instead of being placed directly upon the roof, can be placed at a distance therefrom of a few centimeters, as shown at Fig. 1, so as to constantly receive the aerial currents.

In cold countries the under sides of the chambers, as shown in Fig. 6, can be isolated from the roof by one or more layers or beds of suitable non-conducting material $b''\ b''$, so as to maintain the calorific action of the solar rays. These hollow plates can be arranged so as to form an air-tight roof, or they can be slightly separated so as to facilitate the entry of the air. In order to assist the action of the solar or calorific rays, glazed frames can be arranged, as shown in Fig. 6 at $c''\ c''$, at a distance of a few centimeters above the sheet-iron plates.

Above the calorific chambers B B is a collector or receiver G, the shape of which may vary. By means of the tubes D D the said collector receives the ammoniacal vapor, which is disengaged under pressure from the solution by the solar heat. The vapor passes through a tube $a$, while by means of a tube $g\ g$ the liquid which might be drawn along by the rapid generation of the vapors from the calorific chambers into the collector G is conducted into another collector M, whence it returns into the chambers through a tube $n\ n$. It will be seen that this arrangement, which may comprise as large a number of hollow plates as may be desired, constitutes a system of circulation in which the liquid coming from the chambers is constantly brought back to the bottom of the chambers B B in order to be continually submitted to the action of the solar rays. Instead of an aqueous ammoniacal solution being employed in the said chambers, I can use any other suitable liquid which, under the action of the solar rays, will readily give off gases or vapors soluble in the liquid which has supplied them after its preliminary cooling.

In the apparatus represented in the drawings, I prefer to employ a concentrated aqueous solution of ammonia of commerce.

By reference to Fig. 2 it will be seen that the apparatus intended to utilize the vapors or gas coming from the calorific chambers is constructed chiefly of a spherical chamber $o\ o\ o\ o$, terminated at its lower part by a cylindrical portion $P'\ P'$, mounted on a receiver $q\ q\ q\ q$ placed or not, as required, in a vessel S S S S, provided at the top with an overflow-basin $x\ x\ x\ x$. At the upper part of the apparatus is a slide-valve casing $y\ y\ y$, the slide $t\ t$ of which is connected with two holes $a'\ c$. Beneath is placed a float N N, through which passes a rod $r\ r$, the said float being surrounded by a flexible diaphragm P P, of the shape of the spherical chamber $o\ o\ o\ o$, and which, by reason of its flexibility, can adapt itself sometimes under the upper half of the said chamber and sometimes over the lower half. The cold water enters through the tube F, placed at the lower part of the apparatus, and passes through the tubular coil $h\ h\ h\ h$, which conducts it to the valve H, through which the water enters the upper part of the apparatus. The water rises until the diaphragm P P comes against the under side of the upper part of the spherical chamber $o\ o\ o\ o$. At the same time the float N N will be raised, and in its upward movement will carry with it the rod $r\ r$, which carries a buffer or stop $n'$ at its upper end and another lower stop $f$ on the part of the rod $r$ just above the float N. In this manner the spherical chamber $o\ o\ o\ o$ becomes filled with water. When the diaphragm is thus in its raised position, if pressure be exerted on its upper part between it and the chamber $o\ o\ o\ o$, it will be lowered and be brought over the lower part of the chamber $o\ o\ o\ o$, and the float will occupy the position indicated by the dotted lines at $N'\ N'$, Fig. 2. The water which is under the float will be thereby driven out of the chamber $o\ o\ o\ o$ through the valve $H^2$ into the tank S S S S, and will flow through the tube $x$. In order to produce the pressure necessary for this purpose, I employ the vapor or ammoniacal gas disengaged from the liquid contained in the calorific chambers by the action of the solar rays or of the atmospheric heat.

The principal part of the mechanism which effects the up and down movement of the float is represented on an enlarged scale in Fig. 5. It comprises a slide $t\ t$, through which passes with slight friction the rod $r$ of the float N, provided with the two stops $n'$ and $f$.

Figure 8:
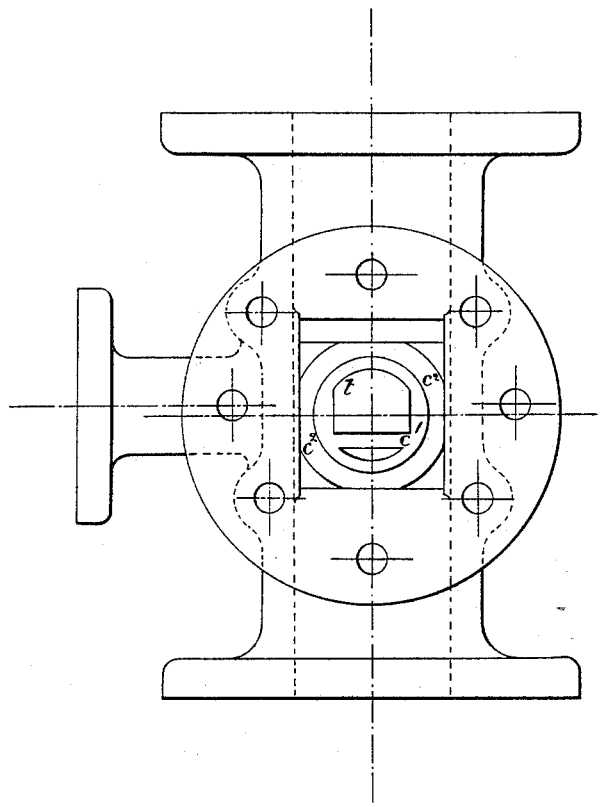

In Fig. 8, which represents a side view of the slide $t\ t$, (the outer wall which covers the slide being removed,) it will be seen that the groove $c'$ extends into the annular space $c^2$, which communicates with the passage $y$. The opposite side of the slide, on which is formed the groove $a''$, works exactly under the same conditions. The passage $y$ corresponds with the two faces of the slide and conducts the gases over the diaphragm P during the introduction through the opening $a$, and brings them back toward the said slide during the discharge through the tube $b$. The float N, having reached the top of the chamber $o\ o\ o\ o$, as shown in Fig. 2, the slide, which, as shown in Fig. 5, was in its lowermost position, will have been raised in the upward movement of the float by the stop $f$, and its groove $c'$ will be brought to coincide with the inlet-opening $c$, communicating with the gas-inlet $a$. The gas will pass through the groove $c'$, which opens at each of its ends into the passage $y$, and passing through the opening $o''$ in the chamber $o\ o\ o\ o$ will press upon the diaphragm and lower it. On the other hand, while the float is descending into its lowermost position, (indicated by the dotted lines at $N'\ N'$, Fig. 2,) the upper stop $N'$ will lower the slide $t\ t$ into the position shown in Fig. 5, and the inlet-opening $c$ will be closed, while the groove $a''$ will be brought opposite the opening $a'$, communicating through the tube $b'$ with the absorption-receiver $q\ q\ q\ q$, Fig. 2. In this receiver the gas will meet with a portion of the ammoniacal solution already brought therein by the action of the apparatus, as hereinafter described, but cooled by the current of water coming from a well and continually passing through the coil $h\ h\ h\ h$. This refrigeration causes the absorption of the ammoniacal gas by the weakened solution which is in the receiver $q\ q\ q\ q$, thereby producing a relative vacuum above the float and the diaphragm P P, which allows a fresh quantity of water to enter the parts $P'\ P'$ through the valve H. This part will become filled, and the diaphragm P P, as well as the float N N, will be again raised. The rod $r\ r$, rising with the float and sliding through the slide $t\ t$, will bring the stop $f$, Fig. 5, in contact with the slide $t\ t$, which, again rising, will close the outlet-opening $a'$ and open the inlet $c$, thus producing the hereinafter-described results, and so on.

The ammoniacal solution is caused to continually enter the receiver $q\ q\ q\ q$ for the purpose of dissolving the ammoniacal gas and to leave the same by any suitable means, such as by a double-acting pump Z. This pump, which is most clearly illustrated in Fig. 7, comprises a piston operated by the rod $r\ r\ r$ of the float, the said rod extending to the point W for the purpose of giving movement to the slide K by means of the catch stud or stop W. One side of the piston is put in communication with the tube $g$ $g$, Fig. 1, by means of the tube $d$ $d$ $d$. The liquid circulating in the roof of the apparatus can then enter the body of the pump Z through the opening Y, through which the tube $d$ passes into the pump-body, (the side being raised,) and act on the piston $v$ $z$ already raised by the float. The cooling therefor effects the dissolution of the ammoniacal gas existing in the receiver $q$ $q$ $q$ $q$, which causes a relative vacuum beneath the float N and diaphragm P. This allows a fresh quantity of water to enter the bottom of the chamber $o$ $o$ $o$ $o$ through the valve H, the water again raising the float N and the diaphragm P. The rod $r$, rising with the float and moving in the interior of the slide $t$ $t$, brings the stop $f$ in contact with the slide $t$ $t$, which, again rising, closes the discharge-opening $a'$ and opens the inlet $c$, thus producing the result already described. The weakened ammoniacal solution is continually drawn into the receiver $q$ by the pump Z with the object of dissolving the ammoniacal gas, which has done its work. The pump Z (specially shown in Fig. 7) comprises a piston $v$ $z$ operated by the rod $r$ of the float. This rod extends to the bottom of the pump, where it carries a stop W, serving to give movement to the slide K. One of the sides of the piston $v$ $z$ communicates with the tube $g$, Fig. 1, by means of the tube $d$. The ammoniacal solution circulating in the calorific spaces exposed to the sun's rays can enter the pump Z by the opening Y, through which the tube $d$ extends into the pump-body, (the slide K being raised,) and can act upon the piston $v$ $z$ already raised by the float. The pump-body will then be full of the weakened ammoniacal solution coming from the calorific plates, which solution, when the piston returns, will be sent through the opening I and the tube J, into the receiver $q$, which will in this way be fed; but when the piston $v$ $z$ has again descended it will produce above it in the body of the pump Z a vacuum which will be filled as fast as it is produced by the cooled liquid coming from the receiver $q$, the said liquid having absorbed the ammoniacal gas which has done its work. The admission of this liquid coming from the receiver $q$ into the pump-body takes place through the tube $l$ and through a back-pressure valve $l'$. When the piston $v$ $z$ rises again, the enriched ammoniacal solution which fills the pump-body will pass through the valve V', escape through the tube $e$, Figs. 1, 2, and 7, then pass into the collector M, Fig. 1, and thence into the spaces B, to be again subjected to calorific action. The pump-body will thus become filled with the ammoniacal solution which, when the piston returns, will be driven through the opening I and tube J into the receiver $q$ $q$ $q$ $q$, which will in this manner be supplied; but when the piston $v$ $z$ shall have descended, as just described, a vacuum will be produced above the same in the body of the pump Z, which vacuum will be immediately filled up by the liquid from the receiver $q$ $q$ $q$ $q$. This liquid will have passed through a tube $l$ $l$ and through a valve $l'$ placed at the top thereof. The body of the pump will in this manner be filled above the piston $v$ $z$ with the solution which will have dissolved the ammoniacal gas in action. When the piston again rises, the said solution passing through the valve V' will escape through the tube $e$ $e$ $e$, Figs. 1, 2, and 7, whereby it will be led back into the collector M, Fig. 1, and thence into the calorific chambers B B B B to be again submitted to the action of the solar rays.

It will be seen that the action of the apparatus may be summed up by three operations—viz., first, the calorific circulation which takes place in the chambers B B, whereby the motive gas is produced; second, the cooling circulation which is caused by the water drawn up from the ground and which carries off the sensible heat of the solution employed as well as the latent heat of the ammoniacal vapor utilized; third, the circulation of the ammoniacal solution, which, when cool, produces the vacuum in the cooling-receiver $q$ $q$ $q$ $q$, and when heated in the chambers B B B B produces the necessary pressure for working the apparatus.

Having now particularly described and ascertained the nature of my said invention, and in what manner the same is to be performed, I declare that what I claim is—

1. In apparatus for utilizing solar or atmospheric heat, the combination, with metal chambers isolated at their lower part, of glazed frames arranged above.

2. In apparatus for utilizing solar or atmospheric heat, the combination, with the float N, surrounded with a diaphragm P, of the rod $r$, the slides $t$ and K, and the piston $v$ $z$, for the purpose set forth.

3. In apparatus for utilizing atmospheric heat, the combination of the pump Z, the coil $h$, and the receiver $q$, filled with weakened ammoniacal solution, for the purpose hereinbefore described.

CHARLES TELLIER.

Witnesses:
C. O. RUNTEAN,
H. DUFRENÉ.